United States Patent
Gashi et al.

(10) Patent No.: US 7,861,813 B2
(45) Date of Patent: Jan. 4, 2011

(54) VEHICLE GROUND CONNECTION COMPRISING A WHEEL AND A SUSPENSION INTEGRATED THEREIN

(75) Inventors: Rexhep Gashi, Givisiez (CH); Daniel Laurent, Marly (CH)

(73) Assignee: Conception et Developpement Michelin S.A., Givisiez (CH)

( * ) Notice: Subject to any disclaimer, the term of this patent is extended or adjusted under 35 U.S.C. 154(b) by 757 days.

(21) Appl. No.: 11/663,403

(22) PCT Filed: Sep. 20, 2005

(86) PCT No.: PCT/EP2005/054708

§ 371 (c)(1),
(2), (4) Date: Mar. 21, 2007

(87) PCT Pub. No.: WO2006/032669

PCT Pub. Date: Mar. 30, 2006

(65) Prior Publication Data

US 2008/0100020 A1 May 1, 2008

(30) Foreign Application Priority Data

Sep. 21, 2004 (FR) .................................. 04 09986

(51) Int. Cl.
*B60K 1/00* (2006.01)
(52) U.S. Cl. ................ 180/65.51; 180/65.6; 280/124.1
(58) Field of Classification Search ................ 180/65.1, 180/65.51, 65.6; 280/124.1, 79.4, 86.751, 280/93.502, 93.512; 267/68
See application file for complete search history.

(56) References Cited

U.S. PATENT DOCUMENTS

| 3,937,293 | A | * | 2/1976 | Susdorf | 180/65.6 |
| 4,461,367 | A | * | 7/1984 | Eichinger et al. | 180/252 |
| 4,913,258 | A | * | 4/1990 | Sakurai et al. | 180/242 |
| 5,048,860 | A | * | 9/1991 | Kanai et al. | 280/86.757 |
| 5,087,229 | A | * | 2/1992 | Hewko et al. | 475/149 |
| 5,180,180 | A | * | 1/1993 | Yamashita et al. | 180/253 |
| 5,322,141 | A | * | 6/1994 | Brunner et al. | 180/65.51 |
| 6,113,119 | A | * | 9/2000 | Laurent et al. | 280/124.1 |
| 6,257,604 | B1 | * | 7/2001 | Laurent et al. | 280/124.127 |
| 6,349,781 | B1 | * | 2/2002 | Kruse | 180/7.2 |
| 6,386,553 | B2 | * | 5/2002 | Zetterstrom | 280/5.51 |
| 2004/0020420 | A1 | * | 2/2004 | Evans et al. | 116/34 R |
| 2006/0272871 | A1 | * | 12/2006 | Murata | 180/65.5 |

FOREIGN PATENT DOCUMENTS

| EP | 0 744 313 A | 11/1996 |
| EP | 0 878 332 A | 11/1998 |
| GB | 897 619 A | 5/1962 |

* cited by examiner

*Primary Examiner*—J. Allen Shriver, II
*Assistant Examiner*—Jacob Meyer
(74) *Attorney, Agent, or Firm*—Cohen Pontani Lieberman & Pavane LLP

(57) ABSTRACT

A ground contact system for a vehicle. The ground contact system comprises a wheel, a hub carrier, means for driving the wheel using at least one rotary motor secured to the hub carrier, reduction means comprising at least one gearwheel connected to the wheel and at least one pinion connected to the rotary motor, a sliding-bar suspension suspending the wheel from a support connected to the vehicle, and braking means. The braking means comprises a brake disc connected by its periphery to the wheel, and a brake calliper positioned inside the brake disc.

10 Claims, 4 Drawing Sheets

VEHICLE GROUND CONNECTION COMPRISING A WHEEL AND A SUSPENSION INTEGRATED THEREIN

RELATED APPLICATION

This is a U.S. National Phase Application under 35 USC 371 of International Application PCT/EP2005/054708, filed on Sep. 20, 2005.

FIELD OF THE INVENTION

The present invention relates to the ground contact systems of motor vehicles. It relates in particular to ground contact systems in which the vertical suspension uses a sliding bar installed within the wheel.

Patent Application EP 0878332 discloses such a ground contact system in which the degree of freedom of vertical suspension of the hub carrier with respect to the chassis of the vehicle is permitted by the movement of a vertical bar secured to the hub carrier in guide means secured to a support, the support being itself connected to the chassis. This ground contact system also incorporates a rotary traction motor, reduction means connecting the traction motor to the wheel, braking means, a suspension spring, an electromechanical machine for controlling the suspension movements and a pivot allowing the wheel to be steered. The structure of this ground contact system does indeed allow all the intended functions to be fulfilled.

SUMMARY OF THE INVENTION

One objective of the invention is to propose a ground contact system of the aforementioned type in which the weight-rigidity-size compromise is significantly improved.

The issue is that the weight of a ground contact system, particularly the weight of its unsprung part, is an essential characteristic in the dynamic performance of the vehicle. The mechanical rigidity of a ground contact system is also an essential characteristic. Insufficient rigidity may have a negative effect on the quality of the guiding of the plane of the wheel, and may also have detrimental consequences on the lifespan of the components of the ground contact system, resulting, for example, from material fatigue or wear associated with the friction caused by deformation. It will be understood that size is a particularly important aspect because one particular benefit of this type of ground contact system is that it incorporates all the functions within the interior volume of the wheel.

The person skilled in the art knows that these three aspects (weight, rigidity, size) are closely interrelated. It can therefore also be said that the objective of the invention is to propose a ground contact system of the aforementioned type for which at least one of the three aspects is significantly improved without necessarily penalizing the other aspects.

This objective is achieved by a ground contact system comprising a wheel, a hub carrier, means for driving the wheel using at least one rotary motor secured to the hub carrier, reduction means comprising at least one gearwheel connected to the wheel and at least one pinion connected to the rotary motor, a sliding-bar suspension suspending the wheel from a support connected to the vehicle, braking means, the said braking means comprising a brake disc connected by its periphery to the wheel, and a brake calliper positioned inside the brake disc. As a preference, the brake disc, the motor pinion and the gearwheel are located substantially in the same plane.

In a preferred embodiment, the pinion and the gearwheel have helical teeth, the pinion being guided with respect to the hub carrier by guide means independently of the axis of the rotary motor.

The guiding of the rotary assembly comprising the wheel, the brake disc and the gearwheel is afforded by a pair of rolling bearings preferably positioned around a male part of the hub carrier.

As a preference, the sliding-bar suspension comprises a bar secured to the hub carrier, the axis of the bar being positioned substantially along the axis of the wheel and substantially vertically in the central plane of the wheel, the degree of freedom of suspension of the hub carrier with respect to the chassis of the vehicle being permitted by the movement of the bar in guide means connected to the support.

As a preference, the ground contact system according to the invention further comprises an electromechanical machine for controlling the suspension movements. The electromechanical machine is advantageously a rotary machine secured to a suspension pinion, the said pinion collaborating with a rack secured to the bar.

If the wheel is a steered wheel, the ground contact system according to the invention further comprises a pivoting connection between the guide means and the support so as to allow the wheel to be steered about a pivot axis. As a preference, this pivot axis substantially corresponds to the axis of the bar.

Other objectives and advantages of the invention will become more clearly apparent from the description which will follow of a preferred embodiment.

DETAILED DESCRIPTION OF THE DRAWINGS

Figure 1:
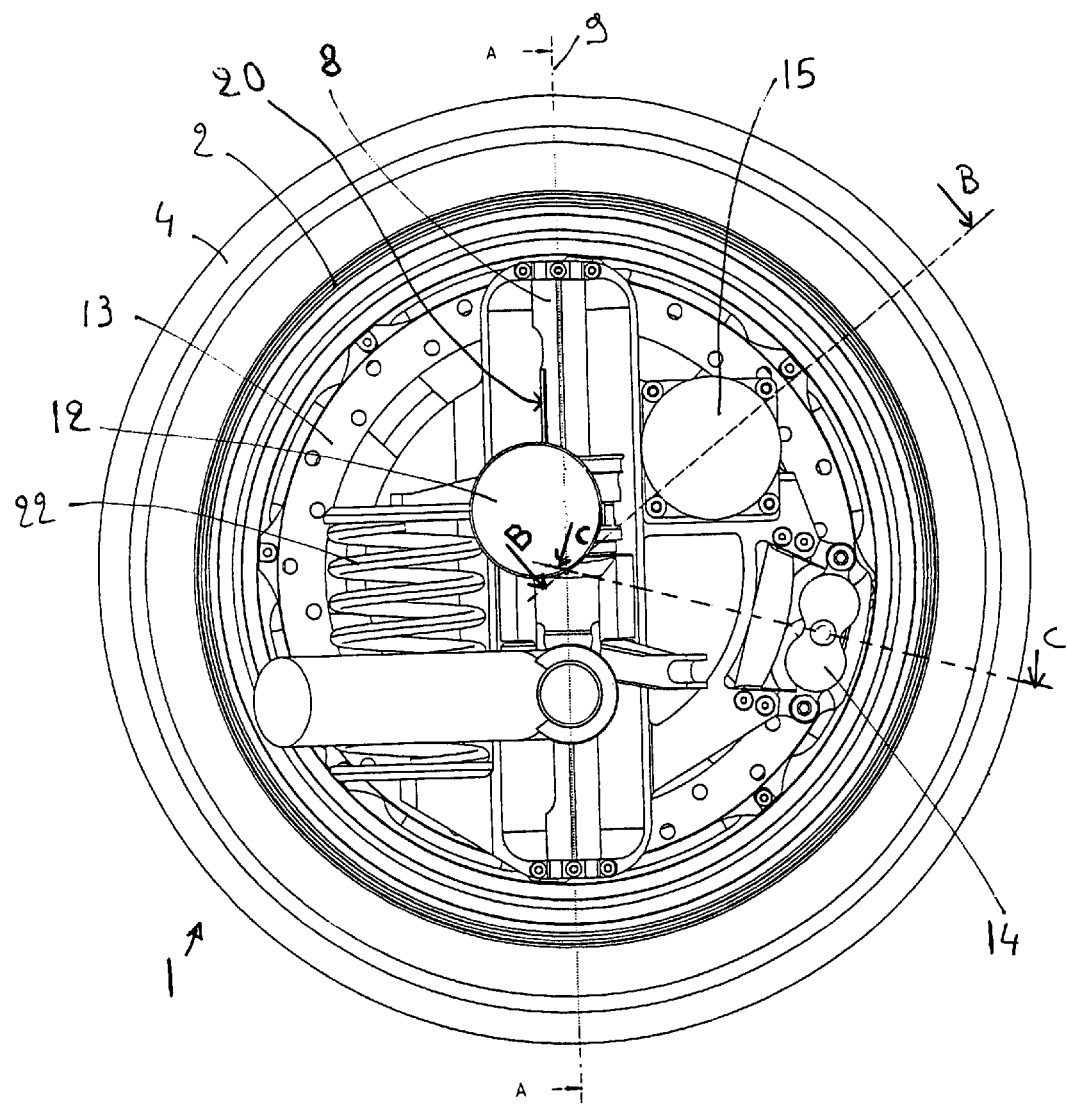
FIG. 1 is a plan view along the axis of the wheel of a preferred embodiment of the ground contact system according to the invention.

FIGS. 1 to 4 show a wheel 1 assembled from a rim 2 and from a wheel disc 3. A tire 4 has been depicted, mounted on the rim 2. The wheel 1 is mounted to rotate about its axis 5 by means of rolling bearings 6 on a hub carrier 7. The hub carrier is secured to a substantially vertical bar 8. The bar can slide along its axis 9 with respect to a support 10 thanks to guide means 11, for example involving rollers. This movement corresponds to the suspension travel of the ground contact system according to the invention. As a preference, the suspension movement is actively controlled by a rotary electromechanical machine 12. The support 10 is intended to be connected to the body of the vehicle, either rigidly or via a connection that allows additional degrees of freedom such as, for example, a variation in body height and/or a variation in wheel camber, filtering of vibrations or horizontal suspension.

Figure 5:
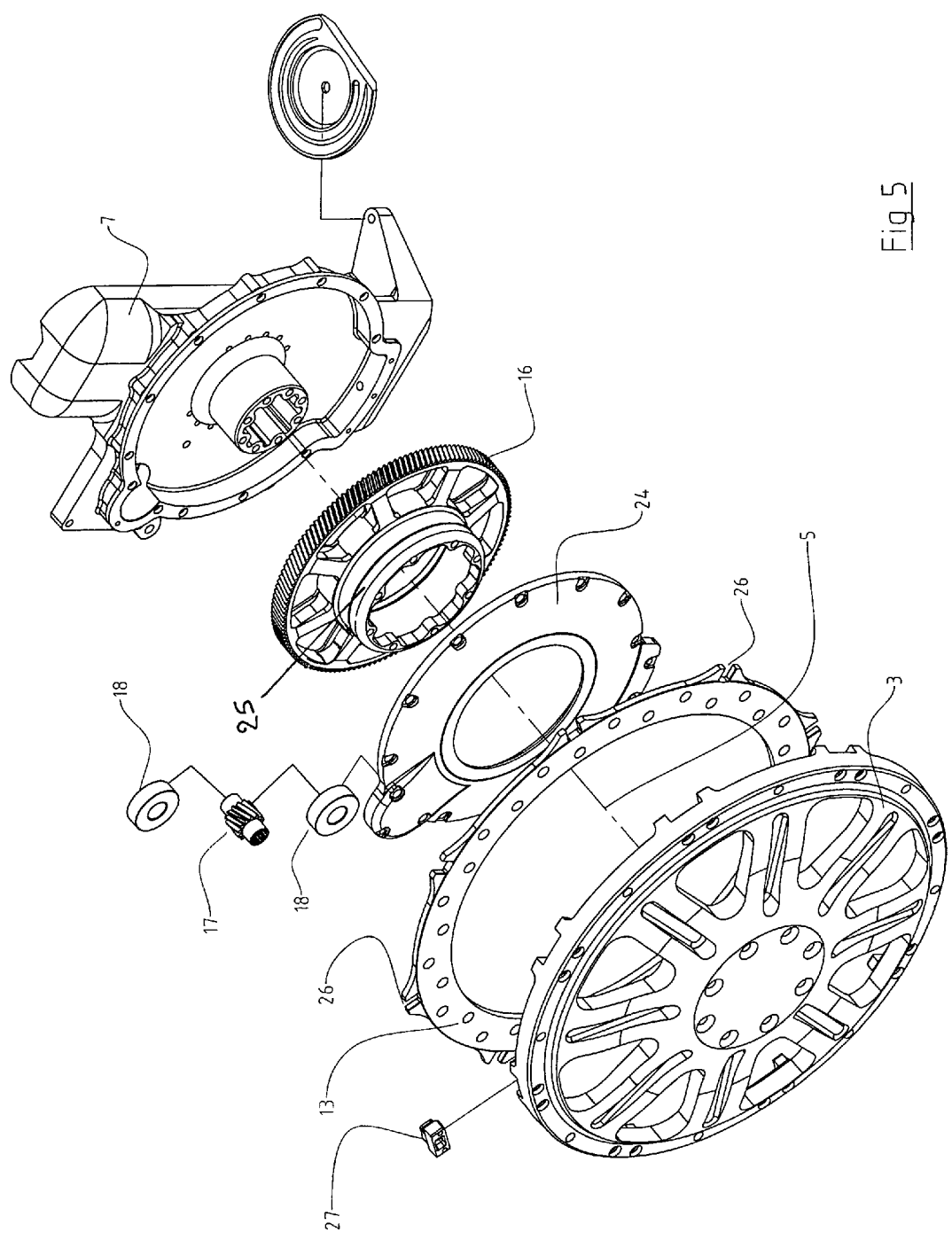
FIG. 5 is an exploded perspective view of the main components of the ground contact system of FIG. 1.

The braking means comprise a brake disc 13 connected by its periphery to the wheel 1 and a calliper 14 secured to the hub carrier 7 and arranged inside the brake disc 13. The calliper therefore straddles the brake disc from inside the latter. One advantage of this layout is that the braking forces experienced by the wheel, that is to say in this instance, forces exerted by the tire 4 on the rim 2 as a result of the braking, are transmitted directly. As a preference, the brake disc 13 is mounted "floating" on the wheel, that is to say that the connection between the brake disc and the wheel allows axisymmetric relative displacements, particularly in the radial direction. The amplitude of these displacements is limited to a few millimeters. A floating assembly allows for thermal expansion of the disc and may also make it possible to reduce heat exchanges between the wheel and the brake disc. FIG. 5 illustrates one embodiment of such an assembly. In this figure, pegs 27 secured to the wheel disc 3 can be seen, these pegs being housed in slots 26 in the brake disc 13.

The vehicle is provided with driving power by wheel driving means comprising a rotary motor 15 mounted on the hub carrier 7. As a preference, the motor 15 is an electric motor. An electric motor may also be used as a retarder and allow some of the kinetic energy of the vehicle to be recovered in electrical form. In this case, the power of the mechanical braking means can be reduced.

Reduction means comprise at least one gearwheel 16 connected to the wheel and at least one pinion 17 driven by the rotary motor 15. One or more additional gearwheels may be interposed between the driving pinion 17 and the gearwheel 16 either permanently, so as to provide additional reduction ratios, or in a controlled fashion so as to offer a choice of reduction ratios.

Advantageously, the element forming the gearwheel 16 also constitutes the hub onto which the wheel is fixed. For that reason, the wheel bearings 6 are positioned in a bore of the central part of the gearwheel and the wheel is bolted onto an axial continuation 25 of this central part.

As a preference, the brake disc 13, the gearwheel 16 and the pinion 17 are positioned substantially in the same plane, that is to say that their total size along the axis 5 of the wheel is substantially equal to the axial size of the widest component (in this instance the pinion). This feature is clearly identifiable in FIG. 3. It can also be seen that the rolling bearings 6 are themselves also positioned substantially in the same plane. It will be understood that this layout, which is advantageous from the axial size standpoint, also allows a reduction in mass and/or an increase in rigidity.

As a preference, the hub carrier 7 comprises a male part around which the wheel bearings 6 are fitted. By comparison with the layout in application EP 0878332, in which the wheel bearings are held in a central opening of the hub carrier, the intrinsic rigidity of the guiding of the wheel is significantly improved.

As a preference, the guiding of the pinion 17 is a function performed by the hub carrier, for example via a pair of ball or roller bearings 18. The pinion is therefore not carried by the shaft of the motor 15 but has its own guide means. The pinion of course remains driven by the motor shaft, via connecting means such as complementary spines known per se for example. In this way, whatever the magnitude of the transmitted torque, the quality of the mesh between the pinion and the gearwheel remains satisfactory because it is dependent on neither the rigidity nor the guiding of the motor shaft.

As a preference, the pinion and the gearwheel have helical teeth.

The guide means 11 guiding the bar 6 in terms of translation are "frictionless", that is to say that they have as little friction as possible. Guiding using rolling bearings is highly appropriate. Use may be made of rollers 19 collaborating with runways formed on the bar, the rollers being mounted to rotate on and with respect to the guide member. The contact surfaces sliding relative to one another could also be imagined, provided that they have an appropriate treatment or that they are sufficiently lubricated. For example, a fluid bearing may be used.

As a preference, to control the travel of the wheel, use is made of a rotary electromechanical machine 12. This electromechanical machine acts via a suspension pinion (not depicted) on a rack 21 secured to the bar 8. This arrangement has the advantage of lending itself particularly well to active control of suspension characteristics, and more specifically to direct electrical control.

As a preference, a spring 22 (for example a coil spring) acts between the hub carrier 7 and the guide means 11 so as to bear some, and preferably all, of the static load of the vehicle.

As a preference, the axis 9 of the bar is positioned substantially on the axis of the wheel 5 and substantially vertically in the central plane of the wheel, that is to say that the bar is perfectly centred with respect to the wheel. One advantage of this layout is that it helps suspension travel and reduces the mechanical stresses on the bar and on its guiding.

Figure 2:
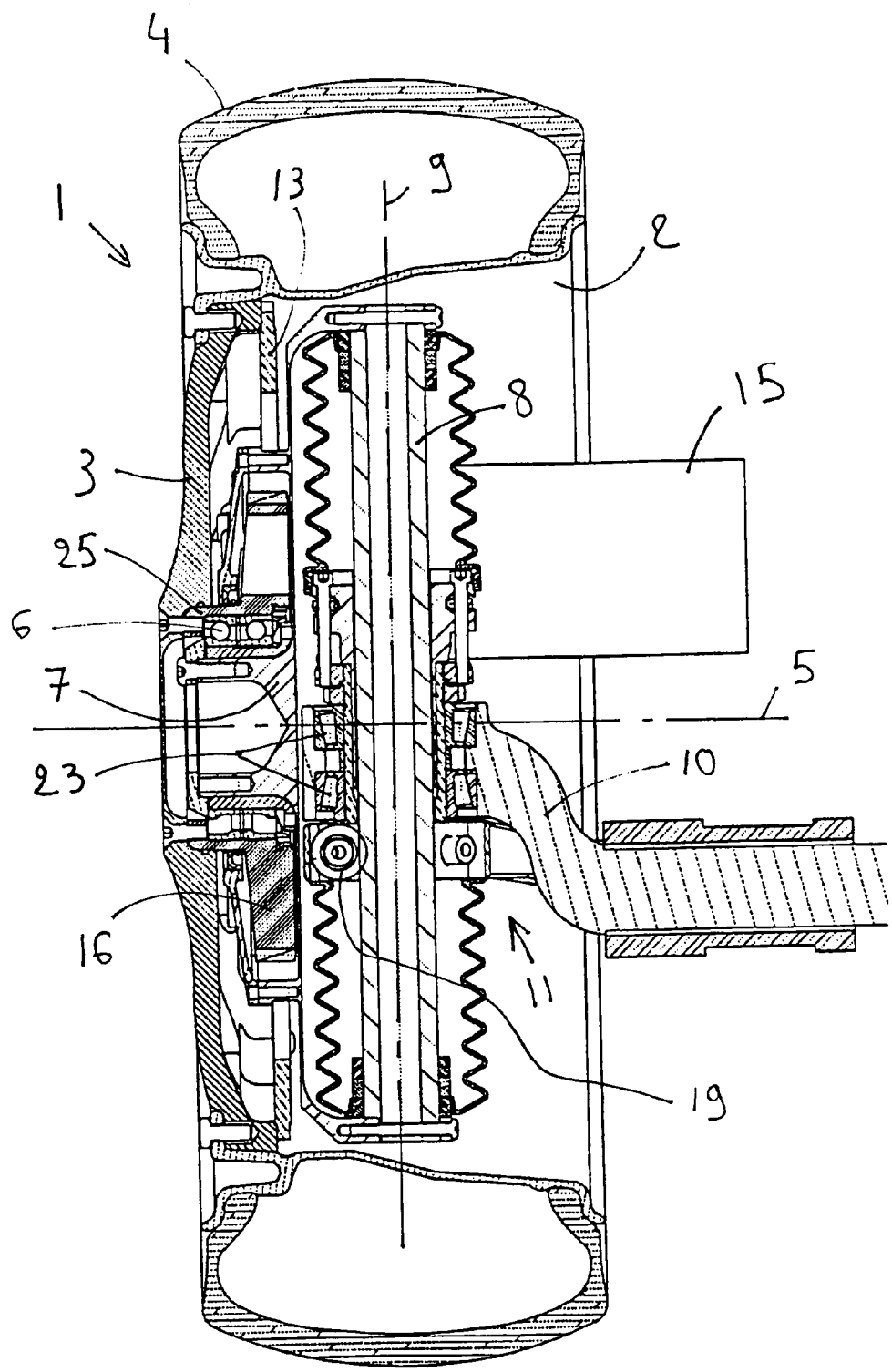
FIG. 2 is a view in section on the vertical plane passing through the axis of the wheel of the embodiment of FIG. 1 (plane A-A in FIG. 1).
Figure 3:
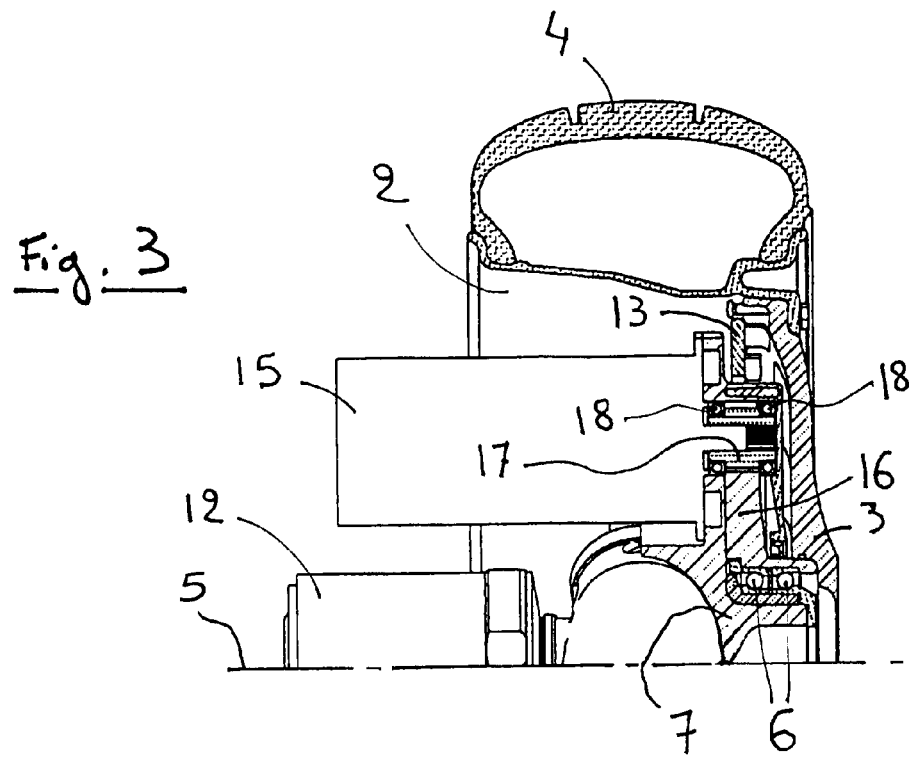
FIG. 3 is an axial half-section on B-B of the embodiment of FIG. 1.
Figure 4:
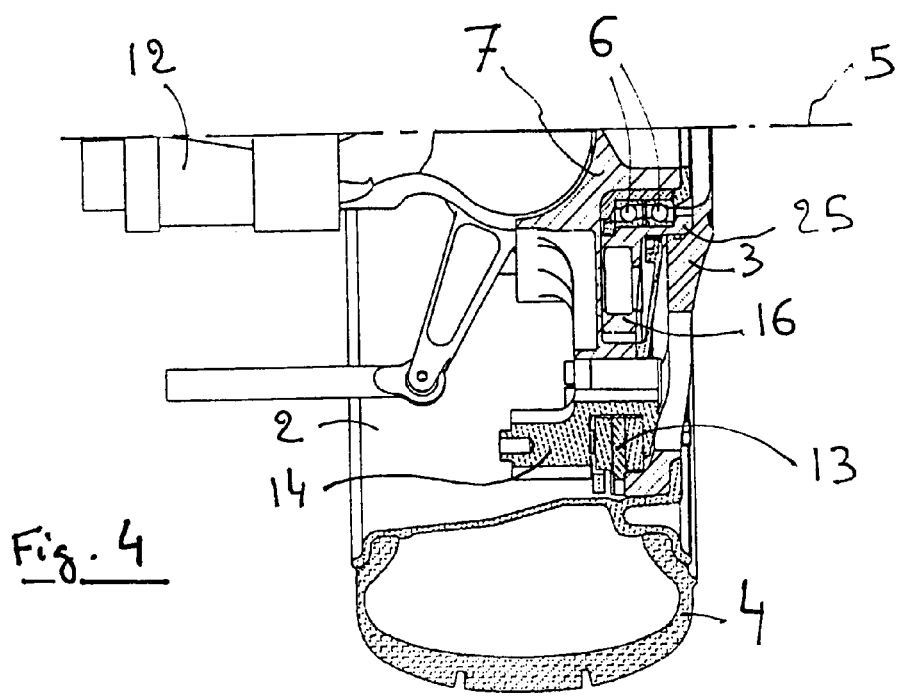
FIG. 4 is an axial half-section on C-C of the embodiment of FIG. 1.

As a preference also, when the wheel is a steered wheel of the vehicle, the axis 9 of the bar corresponds also to the pivot axis. This is the case depicted here. FIG. 2 shows that the pivoting connection is provided by a set of tapered roller bearings 23. These bearings allow the guide means 11 to rotate relative to the support 10 about the vertical pivot axis. When the pivot axis is positioned in this way, the steered wheels experience only very small steering torques as a result of the forces exerted by the ground.

FIG. 5 very clearly shows that the hub carrier 7 constitutes a casing containing the gearwheel 16 and the pinion 17. This casing is closed by a sealed cover 24 so as to enclose this gearing. The casing may contain a suitable lubricant. This figure also clearly shows the mounting of the pinion 17 on a pair of rolling bearings 18 in the said casing.

The wheel 1 is preferably assembled from a wheel disc 3 and a rim 2, both made of light alloy. As depicted in the drawings, the rim is preferably unitary, that is to say made in one piece.

The figures clearly show the benefit of the invention in terms of the mechanical size of the various components. The compactness of the ground contact system according to the invention makes it possible, for example, to use a wheel that is narrow enough that it does not come into contact with the kerbs during parking manoeuvres (see FIG. 2).

From a weight standpoint, the advantage afforded by the invention is also substantial. Specifically, the preferred embodiment of Patent Application EP 0878332 (visible in FIGS. 1 and 2 of the said application) can be compared with the preferred embodiment of this application. Whereas the suspension travel has been increased from 145 mm to 170 mm and the wheel diameter has been increased from 16 to 17 inches, a reduction in order of 20% in the unsprung mass is obtained.

The various figures show a tire 4 mounted on the rim 2 in an entirely conventional way. Of course, other solutions could be adopted, such as a tire attached permanently to its rim, or a non-inflated elastic tread strip or an elastic tread strip without an air chamber.

The invention claimed is:

1. A ground contact system for a vehicle, the ground contact system comprising:
 a wheel having an axis of rotation,
 a hub carrier,
 means for driving the wheel comprising at least one rotary motor secured to the hub carrier, reduction means comprising at least one gearwheel connected to the wheel and at least one motor pinion connected to the rotary motor, a sliding-bar suspension suspending the wheel from a support connected to the vehicle, braking means comprising a brake disc and a brake calliper, and a pair of rolling bearings positioned around a male part of the hub carrier for guiding rotation of a rotary assembly comprising the wheel, the brake disc and the at least one gearwheel, wherein the brake disc has a periphery connected to the wheel, and the brake calliper is positioned inside the brake disc.

2. The ground contact system according to claim 1, in which the brake disc, the motor pinion and the gearwheel are located and extend substantially in a same plane perpendicular to the axis of rotation of the wheel.

3. The ground contact system according to claim 2, in which the motor pinion and the gearwheel have helical teeth, the motor pinion being guided with respect to the hub carrier by guide means independently of an axis of the rotary motor.

4. The ground contact system according to claim 1, in which the sliding-bar suspension comprises a bar secured to the hub carrier, an axis of the bar being positioned substantially along an axis of the wheel and substantially vertically in a central plane of the wheel, movement of the bar in guide means connected to the support allowing a degree of freedom of suspension movements of the hub carrier with respect to a chassis of the vehicle.

5. The ground contact system according to claim 4, further comprising an electromechanical machine for controlling the suspension movements.

6. The ground contact system according to claim 5, in which the electromechanical machine is a rotary machine secured to a suspension pinion, said suspension pinion collaborating with a rack secured to the bar.

7. The ground contact system according to claim 4, further comprising a pivoting connection between the guide means and the support so as to allow the wheel to be steered about a pivot axis.

8. The ground contact system according to claim 7, in which the pivot axis substantially corresponds to the axis of the bar.

9. The ground contact system according to claim 1, in which the wheel is assembled from a wheel disc and a unitary rim.

10. The ground contact system according to claim 1, in which the periphery of the brake disc is directly connected to the wheel.

* * * * *